United States Patent
Marupaduga et al.

(10) Patent No.: US 10,582,501 B1
(45) Date of Patent: Mar. 3, 2020

(54) MANAGEMENT OF CARRIER ALLOCATION BASED ON INSERTION LOSS

(71) Applicant: Sprint Spectrum L.P., Overland Park, KS (US)

(72) Inventors: Sreekar Marupaduga, Overland Park, KS (US); Rajveen Narendran, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 16/004,891

(22) Filed: Jun. 11, 2018

(51) Int. Cl.
*H04W 72/04* (2009.01)
*H04W 40/22* (2009.01)

(52) U.S. Cl.
CPC ... *H04W 72/0453* (2013.01); *H04W 72/0486* (2013.01); *H04W 40/22* (2013.01)

(58) Field of Classification Search
CPC .................................................. H04W 72/0453
See application file for complete search history.

(56) References Cited

U.S. PATENT DOCUMENTS

| | | | |
|---|---|---|---|
| 9,999,052 B1 | 6/2018 | Marupaduga et al. | |
| 2013/0028147 A1* | 1/2013 | Black | H04B 1/109 370/277 |
| 2013/0273860 A1* | 10/2013 | Pehlke | H04B 1/44 455/78 |
| 2017/0026074 A1* | 1/2017 | King | H04B 1/44 |
| 2017/0063404 A1* | 3/2017 | Langer | H04W 72/0453 |
| 2018/0123562 A1* | 5/2018 | Bradley | H03H 9/605 |
| 2018/0189426 A1* | 7/2018 | Turner | G06F 17/505 |
| 2019/0173543 A1* | 6/2019 | Ganesan | H01Q 21/28 |

* cited by examiner

*Primary Examiner* — Brian D Nguyen

(57) ABSTRACT

When a base station is going to offload a UE from a carrier and is faced with a choice of whether to transition the UE from that carrier to a first carrier or rather to a second carrier, the base station will select the first carrier as the target carrier based at least on a determination that the first carrier has higher insertion loss than the second carrier. In addition, to help offset service of the UE on the high-insertion-loss carrier, the base station may block other UEs from being served on the first carrier.

20 Claims, 6 Drawing Sheets

MANAGEMENT OF CARRIER ALLOCATION BASED ON INSERTION LOSS

BACKGROUND

A typical cellular wireless network includes a number of base stations each radiating to define a respective coverage area in which user equipment devices (UEs) such as cell phones, tablet computers, machine-type-communication devices, tracking devices, embedded wireless modules, and/or other wirelessly equipped communication devices (whether or not user operated), can operate. In turn, each base station could be coupled with network infrastructure that provides connectivity with one or more transport networks, such as the public switched telephone network (PSTN) and/or the Internet for instance. With this arrangement, a UE within coverage of the network could engage in air interface communication with a base station and could thereby communicate via the base station with various remote network entities or with other UEs served by the base station.

Further, a cellular wireless network may operate in accordance with a particular air interface protocol or radio access technology, with communications from the base stations to mobile terminals defining a downlink or forward link and communications from the UEs to the base stations defining an uplink or reverse link. Examples of existing air interface protocols include 3G technologies such as Code Division Multiple Access (CDMA) and Global System for Mobile Communication (GSM), 4G technologies such as Long Term Evolution (LTE) (using orthogonal frequency division multiple access (OFDMA) on the downlink and single-carrier frequency division multiple access (SC-FDMA) on the uplink, and emerging 5G technologies (such as 5G NR (5G New Radio)), among others. Each protocol may define its own procedures for registration of UEs, initiation of communications, handover between coverage areas, and other functions related to air interface communication.

In accordance with the air interface protocol, a base station may provide service on one or more carrier frequencies, referred to as carriers. Each such carrier could be frequency division duplex (FDD), with separate frequency channels for downlink and uplink communication, or time division duplex (TDD), with a single frequency channel multiplexed over time between downlink and uplink use. Representative frequency channels could each have a bandwidth (width of frequency spectrum), such as 1.25 MHz, 3 MHz, 5 MHz, 10 MHz, 15 MHz, or 20 MHz, among other possibilities.

On each such carrier, the downlink and uplink could each be structured to define air interface resources and subchannels for carrying information between the base station and UEs. For instance, on the downlink, certain resources could be reserved to carry a reference signal that UEs can measure to evaluate coverage quality, other resources could be reserved to carry other control signaling to UEs, and still other resources could be reserved to carry bearer traffic (e.g., application-layer communications) from the base station to UEs. Likewise, on the uplink, certain resources could be reserved to carry control signaling such as access requests and scheduling requests from UEs to the base station, and other resources could be reserved to carry bearer traffic from UEs to the base station.

When a UE first powers on or otherwise enters into coverage of such a system, the UE could scan for a best coverage area in which to operate and could then engage in signaling to acquire wireless connectivity with the base station that provides that coverage area. For instance the UE could scan various carriers in an effort to find the carrier having the strongest or best quality reference signal as measured by the UE. And the UE could then engage in signaling to establish a radio-link-layer connection with the associated base station on the detected carrier and to register for service with the network via that base station.

Once the UE is so connected and registered, the base station could then provide the UE with data communication service (including possibly voice-over-packet service and other packet-based media services). For instance, when the core network has data destined to the UE, the base station could schedule transmission of that data on a downlink traffic channel of the UE's serving carrier and could accordingly transmit the data to the UE. And when the UE has data for transmission to the core network, the base station could schedule transmission of that data on an uplink traffic channel of the UE's serving carrier, and the UE could accordingly transmit the data to the base station Optimally, a wireless service provider will strategically implement base stations throughout a market area so that served UEs can transition between the base stations' coverage areas without experiencing a loss of coverage. Each base station may include an antenna structure and associated equipment, and the service provider may connect each base station by a landline cable (e.g., a T1 line) with the service provider's core network, to enable the base station to communicate on that network.

In some situations, however, it may be impractical for a wireless service provider to run landline connections to base stations. For instance, where a service provider seeks to provide many small coverage areas blanketing a market area or to fill in coverage holes between coverage of other base stations, the service provider may implement many small-cell base stations throughout the market area, but it may be inefficient or undesirable to run landline cables to every one of those small-cell base stations.

To provide coverage in such locations, the wireless service provider may instead implement relays, each of which could be configured to operate in much the same way as a conventional landline-connected base station but could have a wireless backhaul connection to a core network. In particular, each relay could include a relay base station and a UE module referred to as a "UE-relay" (integrated or communicatively linked together). The UE-relay, and thus the relay, could then be served by an existing base station of the network, referred to in that scenario as a donor base station, with the air interface between the UE-relay and the donor base station defining a wireless backhaul connection for the relay. With this arrangement, the relay could thus conveniently communicate with the core network (e.g., with other entities on the core network) via the wireless backhaul connection and the donor base station.

As with conventional UEs (e.g., end-user UEs), when a UE-relay first powers on or otherwise enters into coverage of the network, the UE-relay could discover coverage provided by a base station on a given carrier, and the UE-relay could connect with the base station on that carrier and register for service with the network. The base station, functioning as a donor base station, could then serve the UE-relay as discussed above, and the relay base station could serve one or more end-user UEs. Thus, data from the core network to an end-user UE would flow over the UE-relay's serving carrier from the donor base station to the UE-relay and would then flow from the relay base station to the end-user UE. And data from the end-user UE to the core network would flow from the end-user UE to the relay base station and would then flow over the UE-relay's serving carrier to the donor base station.

OVERVIEW

If a base station is configured to provide service on multiple carriers, the base station may concurrently serve one or more UEs respectively on each of those carriers. This scenario could arise as UEs discover and connect with the base station on different carriers. For instance, some UEs may discover strongest coverage of one of the base station's carriers and may connect with the base station on that carrier, while other UEs may discover strongest coverage of another one of the base station's carriers and may connect with the base station on that other carrier.

A base station may also encounter situations where it would be useful to offload a UE from one of its carriers, to transition the UE from that carrier to another one of the base station's carriers. An example of such a situation could be the presence of heavy load on the carrier, such as an extensive use of the carrier's limited air interface resources. Heavy load on a carrier could be problematic for a UE served on the carrier, as the load could restrict throughput. Further, heavy load could be a significant issue if the UE is a UE-relay (rather than an end-user UE), as restricted throughput to and/or from the UE-relay could impact service of potentially multiple end-user UEs served by the associated relay base station.

When a base station determines that it would be useful to offload a UE from one of its carriers, at issue for the base station may then be which carrier to transition the UE to. Load and/or coverage strength may be a baseline consideration here. For instance, the base station could identify multiple carriers as candidate targets for the UE, based on each candidate target having sufficient capacity and the sufficient UE-reported coverage strength. At issue may then still be which carrier the base station should select as a target carrier for the UE.

The present disclosure provides for consideration of insertion loss associated respectively with each of multiple carriers as a basis to select a target carrier for a UE.

In general, insertion loss for a carrier is the loss in signal power resulting from the insertion of one or more devices in a transmission line. In operation, some base stations are configured with one or more radio frequency (RF) filters, combiners, diplexers, triplexers, and other components that introduce signal loss for the carriers on which the base station provides wireless service. Further, these components may introduce different levels of insertion loss to various carriers. For instance, if a base station is configured with a passive RF filter having a passband that encompasses multiple carriers on which the base station provides service, the filter may introduce more insertion loss to a carrier at the edge of the passband than to other carriers.

Per the present disclosure, when a base station is going to offload a UE from a carrier and is faced with a choice of whether to transition the UE from that carrier to a first carrier or rather to a second carrier, the base station will select the first carrier as the target carrier based at least on a determination that the first carrier has higher insertion loss than the second carrier. Thus, perhaps counterintuitively, the base station will affirmatively opt to transition the UE to a carrier selected based on the carrier's comparatively high insertion loss.

In a representative implementation, this process may work especially well where the UE is a UE-relay or other device that is unlikely to move into poor coverage and that may therefore be able to withstand the insertion loss on the target carrier. Further, to help offset the reduction in quality resulting from transition of the UE to a high-insertion-loss carrier, the base station could also transition one or more UEs away from that high-insertion-loss carrier and could block the high-insertion-loss carrier from being used to serve UEs other than the one that the base station transitioned onto the high-insertion-loss carrier. Offloading and blocking other UEs from being served on the high-insertion-loss carrier may also be especially helpful where the UE at issue is a UE-relay, as it may help to free up carrier capacity for serving the UE-relay, which may in turn help to improve service for end-user UEs served by the associated relay base station.

Accordingly, in a first respect, disclosed is a method for carrier-allocation by a base station, where the base station is configured to provide service on carriers including at least a first carrier and multiple second carriers, where each carrier has a respective insertion loss, and wherein the first carrier has a higher insertion loss than each second carrier. The method includes the base station serving a UE on one of the second carriers. Further, the method includes, while so serving the UE, the base station detecting a trigger to offload the UE from the second carrier on which the base station is serving the UE. And the method includes, responsive to the trigger, (i) the base station making a decision to transition the UE to the first carrier rather than to another one of the second carriers, the decision being based at least in part on the first carrier having higher insertion loss than each second carrier, and (ii) in accordance with the decision, the base station transitioning the UE from being served by the base station on the second carrier to being served by the base station on the first carrier.

In another respect, disclosed is a base station including a wireless communication interface and a controller (e.g., a processing unit and non-transitory data storage having program instructions executable by the processing unit). The wireless communication interface includes at least one antenna structure and at least one radio and is configured to operate on carriers including at least a first carrier and multiple second carriers, where each carrier has a respective insertion loss, and where the first carrier has a higher insertion loss than each second carrier. Further, the controller is configured to carry out operations including, when the base station is serving one or more first UEs on the first carrier and is serving at least a second UE on one of the second carriers, (a) detecting a trigger to offload the second UE from the second carrier, and (b) responsive to the trigger, (i) making a decision to transition the second UE from the second carrier to the first carrier rather than to another one of the second carriers, with the decision being based at least in part on the first carrier having higher insertion loss than each second carrier and (ii) causing the base station to take action in accordance with the decision.

Still further, disclosed is a method for configuring service by a base station, where the base station operates on a frequency band encompassing multiple carriers, including a first carrier and multiple second carriers, and where the first carrier has higher insertion loss than each of the second carriers. The method includes the base station serving a UE on one of the second carriers. Further, the method includes, during the serving, the base station determining that service of the UE should be reconfigured from being on the second carrier to instead being on the first carrier, the determining being based cooperatively on (i) the second carrier being threshold highly loaded, (ii) the UE being a UE-relay rather than an end-user UE, and (iii) the first carrier having higher insertion loss than each other second carrier. And the method includes the base station reconfiguring service of UE in accordance with the determining.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described by way of example with respect to an LTE network. It should be understood, however, that principles of the disclosure can apply in connection with other types of networks as well. Further, even in the context of LTE, it should be understood that variations from the disclosed examples are possible. For instance, features can be added, omitted, combined, distributed, repositioned, and/or re-ordered. In addition, it should be understood that features described as being carried out by one or more entities can be implemented by hardware, firmware, and/or software, such as by a computer programmed with instructions executable to carry out the described features.

Figure 1:
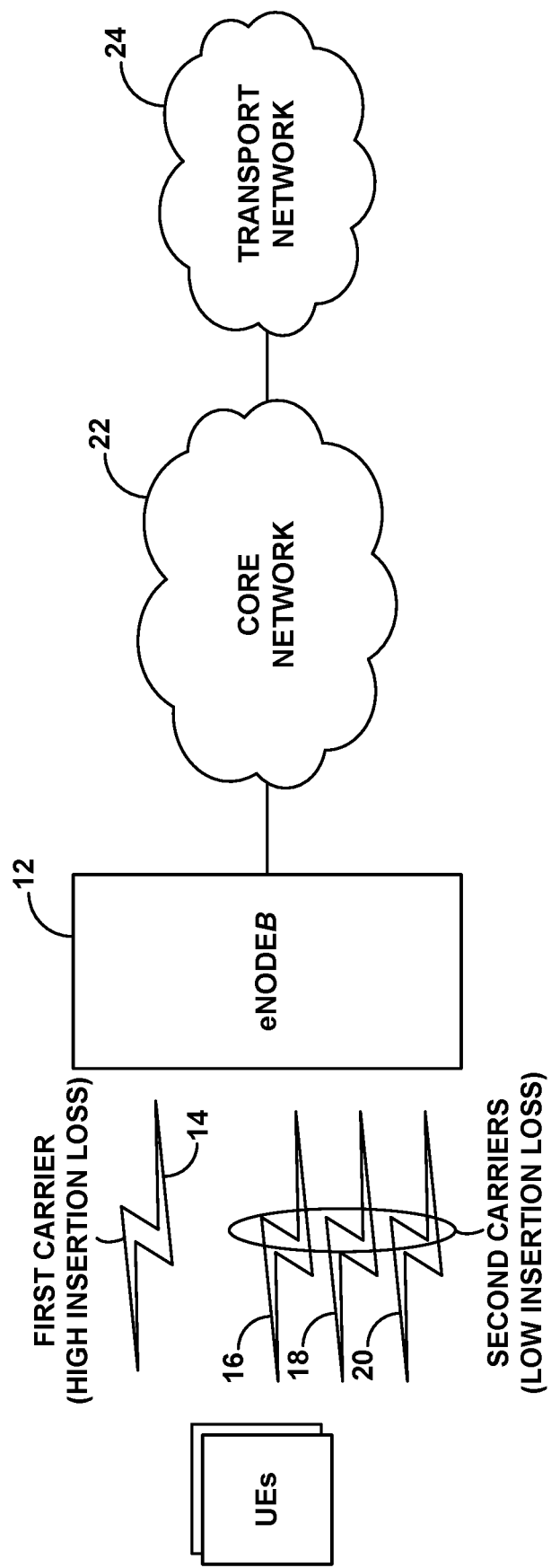
FIG. 1 is a simplified block diagram of an example wireless communication system in which features of the present disclosure can be implemented.

Referring to the drawings, as noted above, FIG. 1 is a simplified block diagram of a wireless communication system in which the present method and system can be implemented. In particular, FIG. 1 depicts a representative LTE network 10, which functions primarily to serve UEs with wireless packet data communication service, including possibly voice-over-packet service, but may also provide other functions. As shown, the LTE network includes a base station (eNodeB) 12 that is configured to provide service on multiple carriers, including a first carrier 14 and multiple second carriers 16, 18, 20. The eNodeB is then shown serving a number of representative UEs and being interfaced with a core network 22 that provides connectivity with a transport network 24 such as the Internet for instance. Although details of the core network are not shown, the core network would include components such as a mobility management entity (MME), a serving gateway (SGW), and a packet data network gateway (PGW).

Each carrier on which the eNodeB is configured to provide service could be TDD or FDD. For example, all of the carriers could be TDD, each occupying a separate respective range of RF frequency spectrum with a respective bandwidth and center frequency. Alternatively, some or all of the carriers could be FDD, each occupying separate downlink and uplink frequency channels that similarly have respective bandwidths and center frequencies, in which case features of the present disclosure could be considered with respect to the downlink and/or uplink channels Further, each carrier could be identified by a globally unique identifier mapped to the carrier's center frequency, and all of the carriers could be defined within a common industry-standard frequency band.

According to LTE, the air interface on each carrier is divided over time into a continuum of frames each 10-milliseconds long, and each frame is divided into ten 1-millisecond subframes. In each subframe, the carrier bandwidth is then divided into 15-kHz subcarriers that can be modulated to carry data, and the subcarriers are grouped into 180-kHz physical resource blocks (PRBs) in which the subcarriers can be modulated to carry data.

Further, certain portions of the LTE air interface are reserved for special use. For instance, in each downlink subframe, an initial time portion is generally reserved to define a downlink control region for carrying control signaling such as scheduling directives and acknowledgement messages to UEs, and the remaining time portion is generally reserved to define a downlink shared channel in which the eNodeB can allocate PRBs as needed to carry data to UEs. Further, certain resources distributed throughout the bandwidth in each subframe are reserved to carry a reference signal that UEs can use to evaluate coverage. And other resources in particular subframes are reserved to carry synchronization signals, broadcast system messages, and the like.

Whereas, in each uplink subframe, certain PRBs at the low-frequency end and high-frequency end of the carrier bandwidth are generally reserved to define an uplink control region for carrying control signaling, such as scheduling requests, from UEs to the eNodeB, and the remaining PRBs throughout the carrier bandwidth are generally reserved to define an uplink shared channel in which the eNodeB can allocate PRBs as needed to carry data from UEs. In addition, certain resources may be reserved to carry random access signaling and the like from UEs to the eNodeB.

As noted above, when a UE enters into coverage of such a network, the UE may scan for coverage. For instance, the UE may scan various carriers by searching for synchronization signals in relation to the carriers' center frequencies and, for each carrier that the UE thereby detects, the UE could evaluate RSRP and/or RSRQ in order to select a carrier on which to connect. The UE may then engage in random access and Radio Resource Configuration (RRC) connection signaling with the eNodeB on the selected carrier, to establish an RRC connection defining a radio-link-layer connection between the eNodeB and the UE. Further, through the established RRC connection, the UE may engage in attach signaling with an MME on the core network to register for service, triggering the MME to establish for the UE one or more bearers for carrying data to or from the UE.

The eNodeB could then serve the UE in an RRC connected mode, in which the eNodeB coordinates data communications over the air to and from the UE. For instance, when the eNodeB receives data destined to the UE, the eNodeB could allocate one or more downlink PRBs in a subframe to carry the data, and in that subframe the eNodeB could transmit to the UE a scheduling directive specifying the allocated PRB(s) and could transmit the data to the UE in the allocated PRB(s). And when the UE has data to transmit, the UE could send to the eNodeB a scheduling request, the eNodeB could allocate one or more uplink PRBs in a subframe to carry the data and could transmit to the UE in advance of that subframe a scheduling directive specifying the allocated PRB(s), and the UE could transmit the data to the eNodeB in the allocated PRB(s).

As discussed above, each carrier on which the eNodeB provides service may have a respective insertion loss, resulting from the insertion of one or more devices in an associated transmission line at the eNodeB. A carrier's insertion loss is generally measured in decibels (dB) and always has a negative value. Further, because insertion loss is a function of the configuration of one or more components at the base station, the insertion loss per carrier is generally a static value that can be measured, quantified, and stored for reference.

As further noted above, one source of insertion loss could be a passive RF filter used by the eNodeB. For instance, the eNodeB could include a bandpass filter configured to limit the eNodeB's transmissions to be substantially within a licensed frequency range that encompasses the carriers on which the eNodeB will provide service. Such a filter could have a passband extending from a low frequency to a high frequency and could be configured to generally pass signals at full strength but to have a −3 dB drop at the edges of the passband. Consequently, a carrier that is positioned in frequency at or near the edge of the passband may have higher insertion loss than a carrier that is positioned elsewhere in the filter's range.

Figure 2:
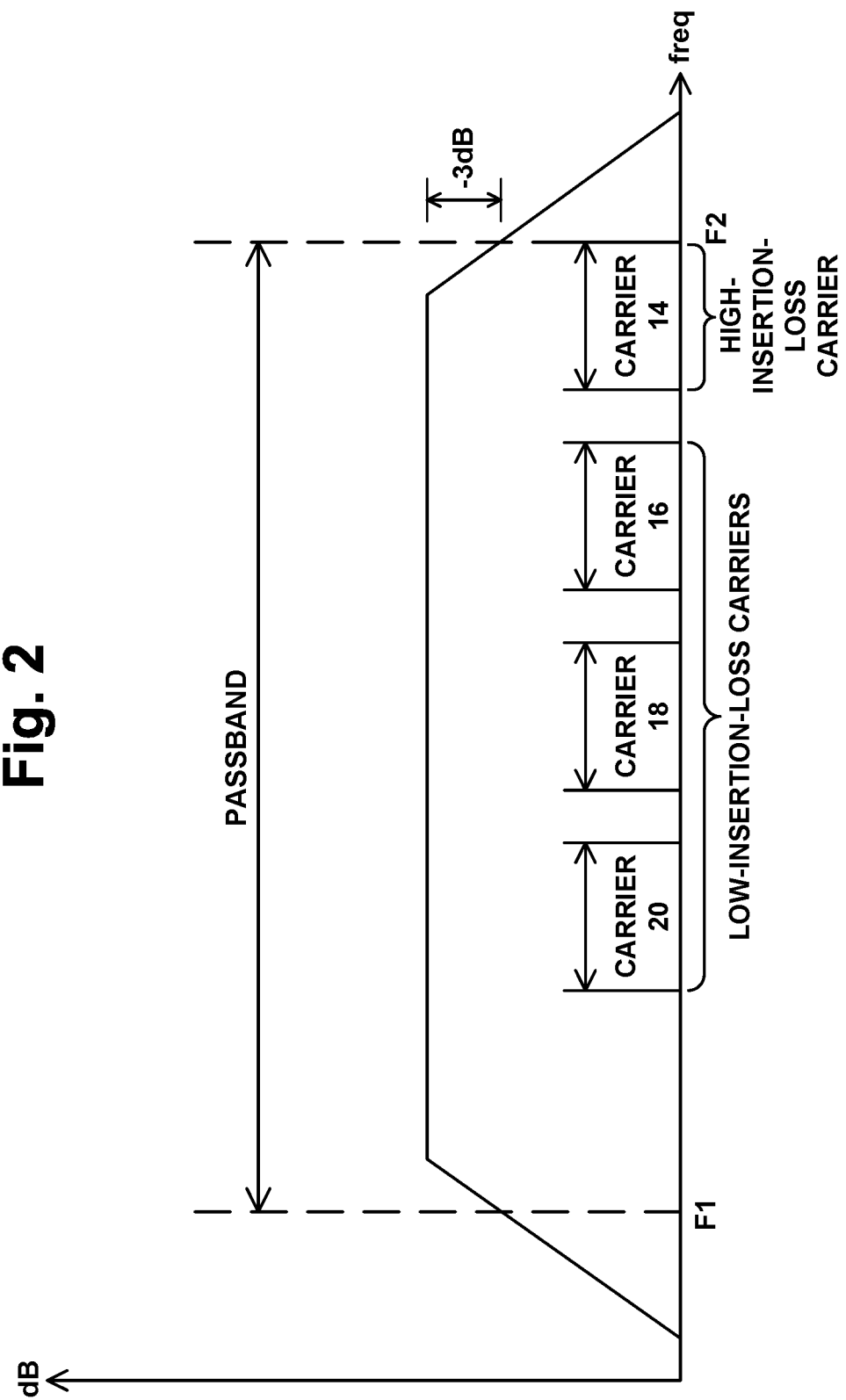
FIG. 2 is a plot representing frequency response of a passive RF filter that could introduce insertion loss.

FIG. 2 illustrates this arrangement by way of example with respect to the carriers on which eNodeB 12 is configured to provide service. In particular, FIG. 2 is a plot representing the frequency response of a passive RF filter that may be in place at the eNodeB. The filter defines a passband extending from a low frequency F1 to a high frequency F2 and provides −3 dB of attenuation at the edges of the passband. Shown defined within the passband are then the four example carriers illustrated in FIG. 1, including a first carrier at the high-end edge of the passband and multiple second carriers in the midsection of the passband. With this configuration, assuming all other insertion-loss factors are equal, the first carrier at the edge of the passband may have higher insertion loss than the other carriers in the passband, due to the attenuation at the filter edge. Thus, the carrier shown at the filter edge could be considered a high-insertion-loss carrier, and the other carriers could be considered low-insertion-loss carriers. In practice, the eNodeB could be provisioned with data that indicates an insertion loss value respective for each of the carriers on which the eNodeB is configured to provide service. These insertion-loss values could be determined in advance by engineering evaluation, component specifications, or the like, and could be loaded into data storage at the eNodeB for reference. The eNodeB could then make use of these insertion loss values as a basis to determine where to offload a UE when appropriate.

In an example implementation, the eNodeB may be serving an example UE on one of the eNodeB's low-insertion-loss carriers, and the eNodeB may encounter a trigger for offloading that UE from that carrier. For instance, the eNodeB may be serving the UE on carrier 16, which is one of the eNodeB's low-insertion-loss carriers, and the eNodeB may detect a trigger for transitioning the UE from being served by the eNodeB on carrier 16 to being served by the eNodeB instead on another one of the eNodeB's carriers.

As discussed above, the trigger could be threshold high load on carrier 16. For this purpose, load could be measured in various ways. For instance, load could be measured as a percentage of the carrier's shared-channel capacity (e.g., PRBs) allocated on average over a sliding window, a quantity of UEs connected with the eNodeB on the carrier, and/or with one or more other metrics. The eNodeB could be configured with a predefined load threshold value and/or different load thresholds per UE or class of UE. Thus, the eNodeB could monitor load on carrier 16 and, by comparison with a predefined threshold, could determine when the load becomes threshold high. In response, the eNodeB could decide to offload the UE from that carrier, as offloading the UE from a heavily loaded carrier may help ensure quality service of the UE.

In the example implementation, when the eNodeB has decided that the UE should be offloaded from a low-insertion-loss carrier, the eNodeB may face a question of which of the eNodeB's other carriers to transition the UE to. In practice, the eNodeB may identify carriers 14, 18, 20 as being candidate target carriers for the UE, perhaps based on consideration of one or more factors. At issue is then which of those candidate target carriers the eNodeB should select as the target carrier for the UE.

In accordance with the present disclosure, the eNodeB will select carrier 14 as the target carrier for the UE, with the selection being based on carrier 14 having higher insertion loss than each of the other candidate carriers. For instance, the eNodeB could refer to its stored data specifying insertion loss per carrier and could determine that the insertion loss of carrier 14 is higher (greater loss) than the insertion loss of each of carriers 18 and 20. For at least this reason, the eNodeB may then decide to transition the UE at issue to carrier 14 rather than to either of carriers 18 and 20.

To transition the UE from being served by the eNodeB on carrier 16 to being served by the eNodeB on carrier 14, the eNodeB could transmit to the UE an RRC connection reconfiguration message that directs the UE to operate on carrier 14 in place of carrier 16, and the UE could respond accordingly by tuning to and operating on carrier 14 instead of carrier 16. Further, the eNodeB could update its own records for the UE accordingly and could then proceed to serve the UE on carrier 14 instead of carrier 16.

In the example implementation, when the eNodeB transitions the UE from being served on carrier 16 to being served on high-insertion-loss carrier 14, the eNodeB may also take action to help ensure that the UE receives sufficient quality service on carrier 14 notwithstanding the high-insertion-loss of the carrier. By way of example, if the eNodeB is serving one or more other UEs on carrier 14, the eNodeB could transition each such other UE from carrier 14 to another of the eNodeB's carriers (e.g., to carrier 16), to help free up capacity on carrier 14 to serve the UE at issue. Further or alternatively, the eNodeB could block other UEs from being served on carrier 14, similarly to help ensure sufficient capacity on carrier 14 to serve the UE at issue. For instance, the eNodeB could turn off its synchronization signal or other broadcast signal on carrier 14, to avoid having UEs discover coverage by the eNodeB on carrier 14. Or the eNodeB could reject any UE requests for service on carrier 14 or could accept such UE requests but then immediately transition the UEs away from carrier 14.

Figure 3:
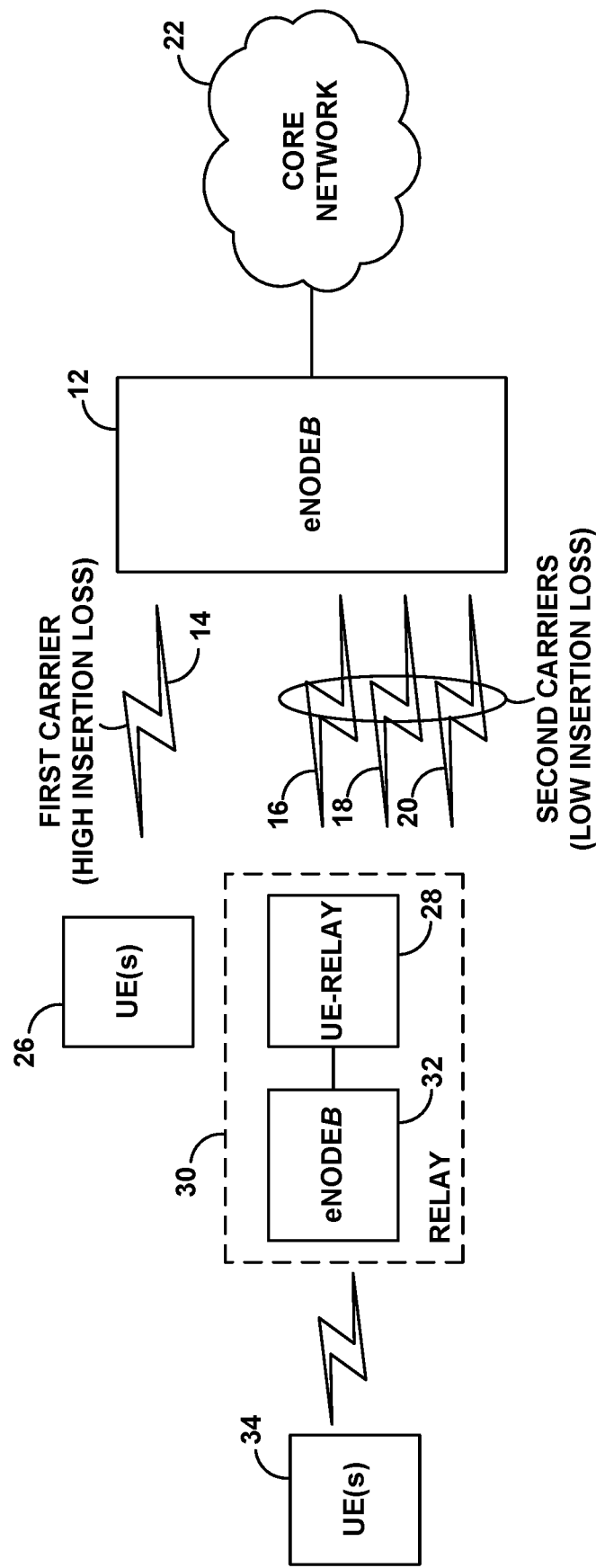
FIG. 3 is another simplified block diagram of an example wireless communication system in which features of the present disclosure can be implemented.

As further noted above, features of the present disclosure could be especially useful where the UE at issue is a UE-relay. FIG. 3 is a simplified block diagram depicting such an arrangement by way of example. As shown in FIG. 3, eNodeB 12 is configured to provide service on the same example carriers as shown in FIG. 1, and the eNodeB is currently serving one or more first UEs 26 and a representative UE-relay 28. UE-relay 28 is an integrated or interconnected component of a relay 30, with the relay 30 further including its own eNodeB 32 component that provides coverage in which to serve other UEs 34. And each of UEs 26 may be an end-user UE or otherwise not a UE-relay. With this arrangement, eNodeB 12 thus functions as a donor eNodeB with respect to UE-relay 28 and as a conventional eNodeB with respect to UEs 26.

In an example implementation, eNodeB 12 may be serving some of UE(s) 26 on high-insertion-loss carrier 14, and eNodeB 12 may be serving UE-relay 28 and perhaps one or more other UEs on low-insertion-loss carrier 16. Applying the process as discussed above, eNodeB may encounter a trigger for offloading UE-relay 28 from carrier 16. For instance, eNodeB 12 may detect that load on carrier 16 is threshold high, which could be particularly problematic for UE-relay 28 given that UE-relay 28 provides connectivity for possibly multiple UEs 24 served by relay 30, and eNodeB 12 could thus determine that UE-relay 28 should be offloaded from carrier 16.

The eNodeB 12 may then be faced with the question of which other of its carriers should be the target carrier for UE-relay 28. In particular, at issue may be whether eNodeB 12 should transition UE-relay 28 from carrier 16 to carrier 14 or rather to one of carriers 18, 20. As noted above, the resolution here could be to transfer the UE-relay 28 to carrier 14 rather than to one of carriers 18, 20, because carrier 14 has higher insertion loss than each of carriers 18, 20.

Although carrier 14 has higher insertion loss, this transition may work well because UE-relay 28, being a UE-relay, is probably stationary and is therefore unlikely to move into poor coverage that could combine with the higher insertion loss to pose a significant quality issue. Further, this same rationale could apply for any UE that is likely stationary rather than mobile.

In addition, to help ensure sufficient quality service for the UE-relay (and ultimately for the relay's served UE(s)) given movement of the UE-relay to a high-insertion-loss carrier, the eNodeB 12 could also offload UE(s) 26 from carrier 14 to one or more of carriers 16, 18, 20. For instance, the eNodeB could offload UE(s) 26 to carrier 16 from which the eNodeB transitioned or is transitioning UE-relay 28. And the eNodeB could also or alternatively block carrier 14 from being used to serve one or more UEs other than UE-relay 28.

Figure 4:
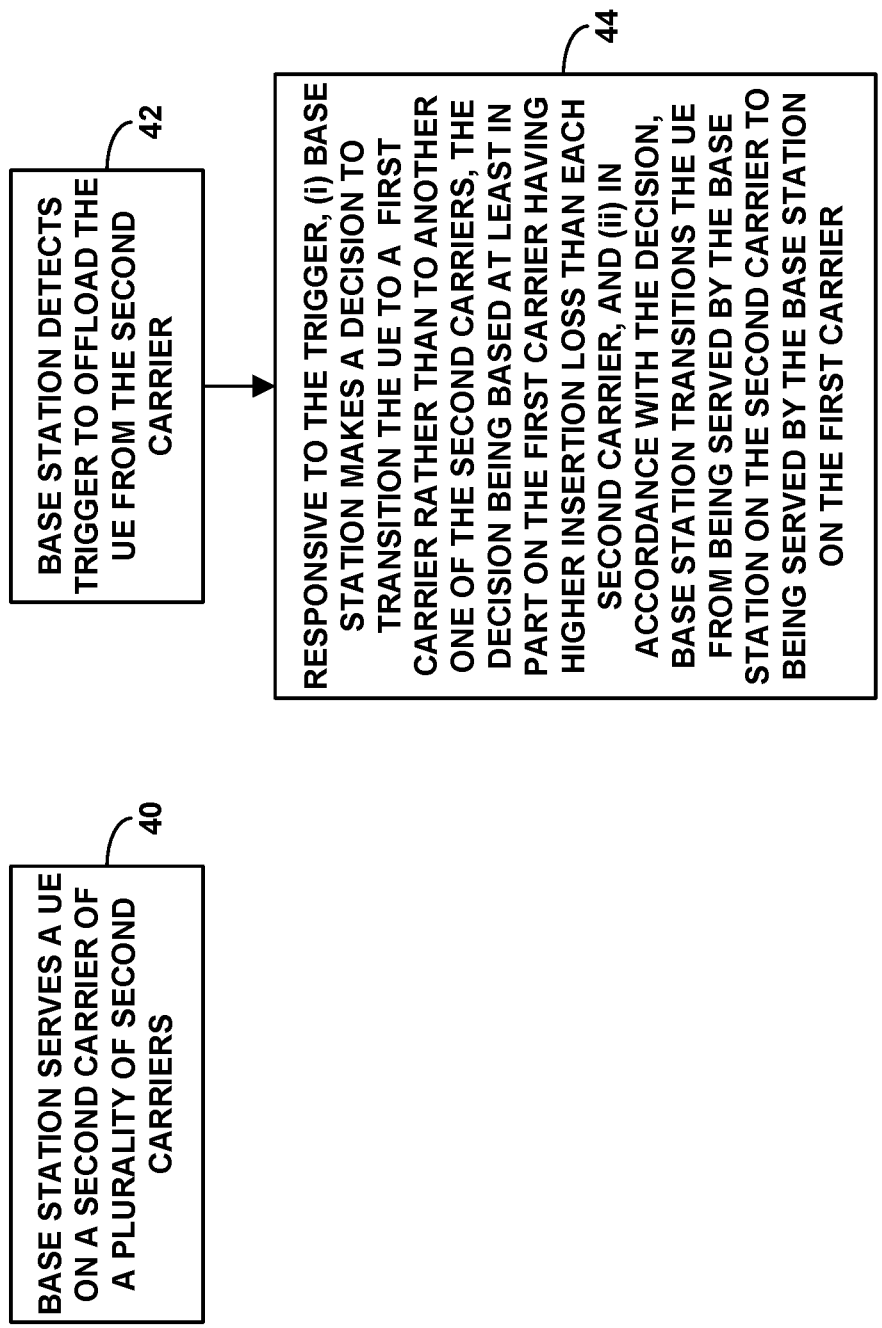
FIG. 4 is a flow chart depicting functions that can be carried out in accordance with the disclosure.

FIG. 4 is next a flow chart depicting a method in line with the discussion above for carrier-allocation by a base station, where the base station is configured to provide service on carriers including at least a first carrier and a plurality of second carriers, where each carrier has a respective insertion loss, and where the first carrier has a higher insertion loss than each second carrier. As shown in FIG. 4, at block 40, the method includes the base station serving a UE on one of the second carriers. At block 42, shown in parallel with block 40 to represent implementation during the serving, the method includes the base station detecting a trigger to offload the UE from the second carrier on which the base station is serving the UE. And at block 44, the method includes, responsive to the trigger, (i) the base station making a decision to transition the UE to the first carrier rather than to another one of the second carriers, the decision being based at least in part on the first carrier having higher insertion loss than each second carrier, and (ii) in accordance with the decision, the base station transitioning the UE from being served by the base station on the second carrier to being served by the base station on the first carrier.

As discussed above, the trigger in this method could include threshold high load on the second carrier. For instance, the trigger could include the second carrier being threshold highly loaded and the UE being a UE-relay that provides connectivity for a relay base station. In addition, the decision to offload the UE from the second carrier could be additionally based on the UE being a stationary UE (e.g., a UE-relay, a home-hub UE, or other typically stationary UE) rather than a mobile UE (e.g., a portable cell phone or the like). For instance, the decision could be additionally based on the UE being a UE-relay (i.e., a UE that provides connectivity for a relay base station).

As additionally discussed above, the base station may serve one or more other UEs on the first carrier, and the method could also include, in view of transitioning the UE to the first carrier, the base station transitioning the one or more other UEs from the first carrier to one or more of the second carriers, such as to the second carrier (i.e., to the carrier from which the UE at issue is transitioned to the first carrier).

Further, the method could additionally include, in view of transitioning the UE to the first carrier, blocking by the base station the first carrier from being used to serve any other UEs. For instance, the blocking could include (i) turning off a broadcast control signal on the first carrier, to prevent any other UEs from detecting coverage on the second carrier, (ii) rejecting any UE request for service on the first carrier, and/or (iii) admitting another UE onto the first carrier and immediately then transitioning the admitted other UE away from the first carrier.

Figure 5:
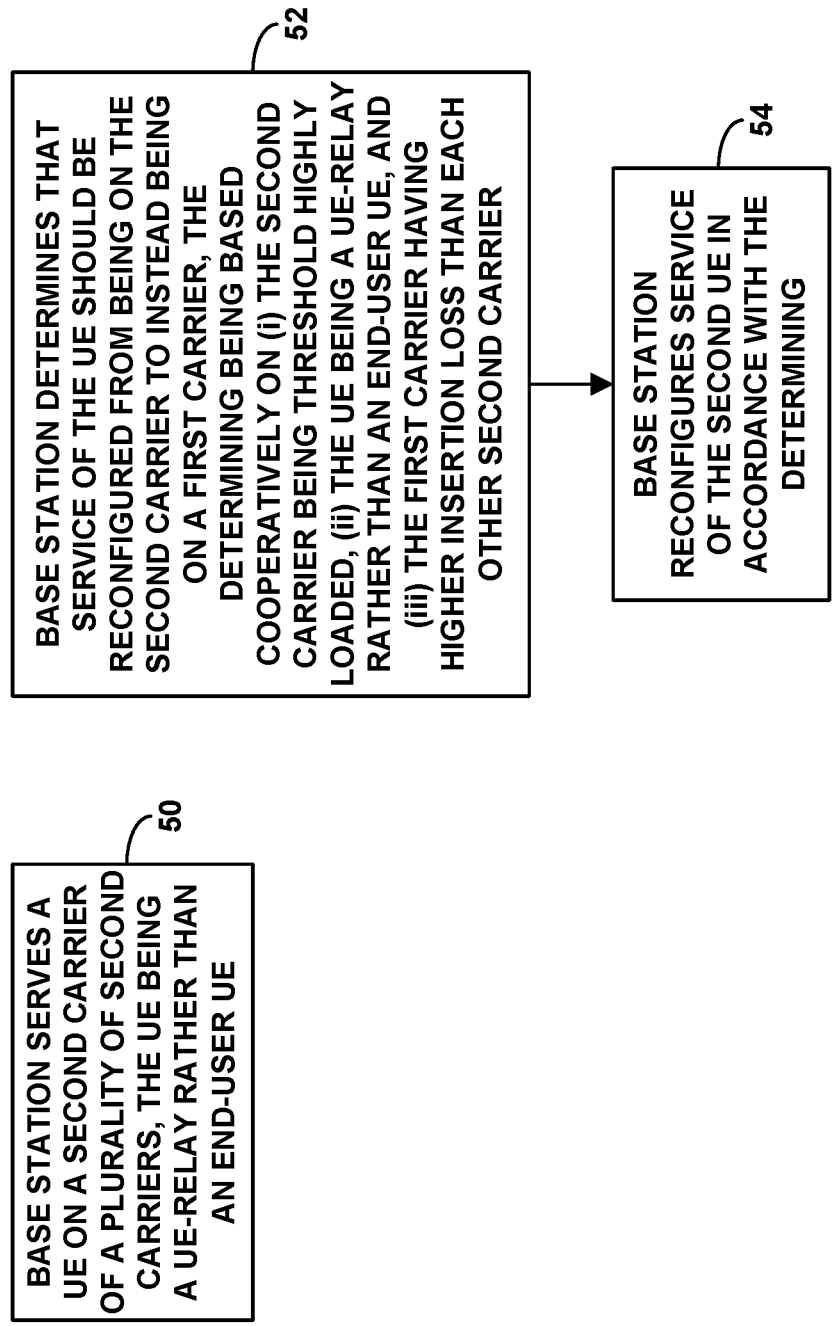
FIG. 5 is another flow chart depicting functions that can be carried out in accordance with the disclosure.

FIG. 5 is next a flow chart depicting a method for configuring service by a base station, where the base station operates on a frequency band encompassing multiple carriers, including a first carrier and multiple second carriers, and where the first carrier has higher insertion loss than each of the second carriers. As shown in FIG. 5, at block 50, the method includes the base station serving a UE on one of the second carriers, the UE being a UE-relay rather than an end-user UE. Further, at block 52, shown occurring during the serving, the base station determines that service of the UE should be reconfigured from being on the second carrier to instead being on the first carrier, the determining being based cooperatively on (i) the second carrier being threshold highly loaded, (ii) the UE being a UE-relay rather than an end-user UE, and (iii) the first carrier having higher insertion loss than each other second carrier. And at block 54, the base station reconfigures service of the second UE in accordance with the determining.

As discussed above, the base station could reconfigure service of a UE from being on one carrier (among possibly others) to being on a different carrier could involve transmitting to the UE a reconfiguration directive and updating associated records. Further, as discussed above, in view of the reconfiguration of service of the second UE from being on the second carrier to being on the first carrier, the method could additionally include (i) the base station reconfiguring service of the one or more other UEs from being on the first carrier to instead being on one or more of the second carriers and (ii) the base station limiting use of the first carrier to be for the second UE.

Figure 6:
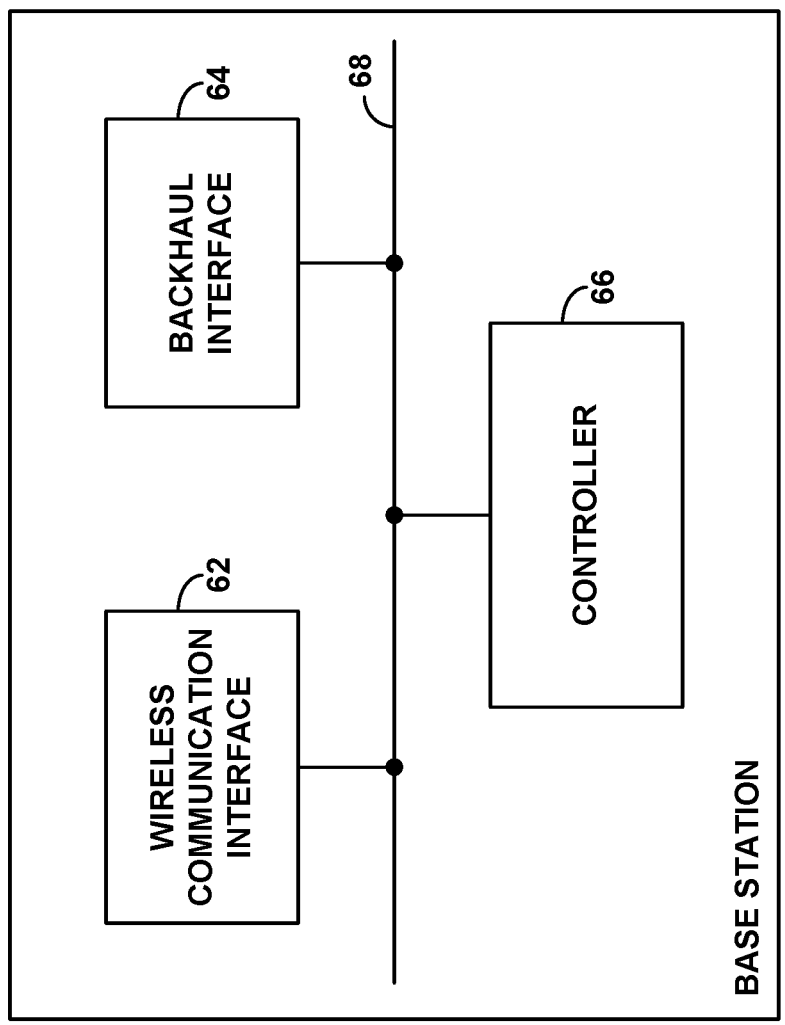
FIG. 6 is a simplified block diagram of an example base station in accordance with the disclosure.

FIG. 6 is a simplified block diagram of an example base station (e.g., eNodeB) operable in accordance with the discussion above. As shown in FIG. 6, the example base station includes a wireless communication interface 62, a backhaul interface 64, and a controller 66, all of which may be communicatively linked together by a system bus, network, or other connection mechanism 68.

In this arrangement, the wireless communication interface 62 may be configured to provide coverage and service on multiple carriers as discussed above. As such, the wireless communication interface 62 may comprise one or more antenna structure, which may be tower mounted or may take other forms, and associated components including one or more radios and power amplifiers. Further, backhaul interface 64 may comprise a wired or wireless interface, such as an Ethernet network communication interface, configured to support communication with other entities, such as with other base stations for instance.

In line with the discussion above, the carriers on which the base station is configured to provide service include at least a first carrier and a plurality of second carriers, where each carrier has a respective insertion loss, and where the first carrier has a higher insertion loss than each second carrier. For instance, the wireless communication interface 62 may include a passive RF filter (e.g., bandpass filter) having a passband that encompasses the various carriers, and the first carrier may be at a filter edge and the second carriers may be in the midsection of the passband.

Controller 66 may then comprise control logic to carry out various base station operations including those discussed above. As such, the controller 66 may take various forms, including but not limited to a processing unit such as one or more processors (e.g., general purpose microprocessors and/or dedicated processing units) and non-transitory data storage (e.g., one or more volatile and/or non-volatile storage components, such as magnetic, optical, or flash storage) holding otherwise embodying program instructions executable by the processing unit to cause the base station to carry out various operations.

In practice, the operations could include, when the base station is serving one or more first UEs on the first carrier and at least a second UE on one of the second carriers, (a) detecting a trigger to offload the second UE from the second carrier, and (b) responsive to the trigger, (i) making a decision to transition the second UE from the second carrier to the first carrier rather than to another one of the second carriers, the decision being based at least in part on the first carrier having higher insertion loss than each second carrier and (ii) causing the base station to take action in accordance with the decision. Various features discussed above can be applied in this context, and vice versa.

Exemplary embodiments have been described above. It should be understood, however, that variations from these embodiments are possible, while remaining within the scope of the invention.

We claim:

1. A method for carrier-allocation by a base station, wherein the base station is configured to provide service on carriers including at least a first carrier and a plurality of second carriers, wherein each carrier has a respective insertion loss, and wherein the first carrier has a higher insertion loss than each second carrier, the method comprising:
   serving by the base station a user equipment device (UE) on one of the second carriers;
   during the serving, detecting by the base station a trigger to offload the UE from the second carrier on which the base station is serving the UE; and
   responsive to the trigger, (i) making a decision by the base station to transition the UE to the first carrier rather than to another one of the second carriers, the decision being based at least in part on the first carrier having higher insertion loss than each second carrier, and (ii) in accordance with the decision, transitioning by the base station the UE from being served by the base station on the second carrier to being served by the base station on the first carrier.

2. The method of claim 1, wherein the trigger comprises threshold high load on the second carrier.

3. The method of claim 1, wherein the trigger comprises (i) the second carrier being threshold highly loaded and (ii) the UE being a UE-relay that provides connectivity for a relay base station.

4. The method of claim 1, wherein the decision is further based on the UE being a stationary UE rather than a mobile UE.

5. The method of claim 1, wherein the decision is further based on the UE being a UE-relay that provides connectivity for a relay base station.

6. The method of claim 1, wherein the base station further serves one or more other UEs on the first carrier, the method further comprising:
   in view of transitioning the UE to the first carrier, transitioning the one or more other UEs from the first carrier to one or more of the second carriers.

7. The method of claim 6, wherein transitioning the one or more other UEs from the first carrier to one or more of the second carriers comprises transitioning the one or more other UEs to the second carrier.

8. The method of claim 1, further comprising, in view of transitioning the UE to the first carrier, blocking by the base station the first carrier from being used to serve any other UEs.

9. The method of claim 8, wherein blocking the first carrier from being used to serve any other UEs comprises an operation selected from the group consisting of (i) turning off a broadcast control signal on the first carrier, to prevent any other UEs from detecting coverage on the second carrier, (ii) rejecting any UE request for service on the first carrier, and (iii) admitting another UE onto the first carrier and immediately transitioning the admitted other UE away from the first carrier.

10. The method of claim 1, wherein the trigger comprises threshold high load on the second carrier.

11. The method of claim 1, wherein the trigger comprises (i) the second carrier being threshold highly loaded and (ii) the second UE providing connectivity for a relay base station.

12. A base station comprising:
   a wireless communication interface including at least one antenna structure and at least one radio, the wireless communication interface being configured to operate on carriers including at least a first carrier and a plurality of second carriers, wherein each carrier has a respective insertion loss, and wherein the first carrier has a higher insertion loss than each second carrier; and
   a controller configured to carry out operations including, when the base station is serving one or more first user equipment devices (UEs) on the first carrier and at least a second UE on one of the second carriers, (a) detecting a trigger to offload the second UE from the second carrier, and (b) responsive to the trigger, (i) making a decision to transition the second UE from the second carrier to the first carrier rather than to another one of the second carriers, the decision being based at least in part on the first carrier having higher insertion loss than each second carrier and (ii) causing the base station to take action in accordance with the decision.

13. The base station of claim 12, wherein the controller comprises a processing unit and non-transitory data storage having program instructions executable by the processing unit to carry out the operations.

14. The base station of claim 12, wherein the trigger comprises the second carrier being threshold highly loaded and the second UE providing connectivity for a relay base station.

15. The base station of claim 12, wherein the operations further include, in view of transitioning the second UE to the first carrier, transitioning the one or more first UEs from the first carrier to one or more of the second carriers.

16. The base station of claim 15, wherein transitioning the one or more first UEs from the first carrier to one or more of the second carriers comprises transitioning the one or more first UEs to the second carrier from which the second UE is transitioned.

17. The base station of claim 12, wherein the operations further include, in view of transitioning the second UE to the first carrier, blocking by the base station the first carrier from being used to serve any of the second UEs.

18. The base station of claim 17, wherein blocking the first carrier from being used to serve any of the second UEs comprises an operation selected from the group consisting of (i) turning off a broadcast control signal on the first carrier, to prevent any of the second UEs from detecting coverage on the second carrier, (ii) rejecting any second-UE request for service on the first carrier, and (iii) admitting a second UE onto the first carrier and immediately transitioning the admitted second UE away from the first carrier.

19. A method for configuring service by a base station, wherein the base station operates on a frequency band encompassing multiple carriers, including a first carrier and multiple second carriers, and wherein the first carrier has higher insertion loss than each of the second carriers, the method comprising:

serving by the base station a UE on one of the second carriers, the UE being a UE-relay rather than an end-user UE;

during the serving, determining by the base station that service of the UE should be reconfigured from being on the second carrier to instead being on the first carrier, the determining being based cooperatively on (i) the second carrier being threshold highly loaded, (ii) the UE being a UE-relay rather than an end-user UE, and (iii) the first carrier having higher insertion loss than each other second carrier; and reconfiguring by the base station service of UE in accordance with the determining.

20. The method of claim 19, wherein the UE is a first UE, the method further comprising, in view of the reconfiguration of service of the UE from being on the second carrier to being on the first carrier, (i) reconfiguring service of one or more second UEs from being on the first carrier to instead being on one or more of the second carriers and (ii) limiting use of the first carrier to be for the first UE.

* * * * *